(12) United States Patent
Thompson et al.

(10) Patent No.: US 9,574,447 B2
(45) Date of Patent: Feb. 21, 2017

(54) MODIFICATION PROCESS AND MODIFIED ARTICLE

(71) Applicant: GENERAL ELECTRIC COMPANY, Schenectady, NY (US)

(72) Inventors: Christopher Edward Thompson, Greenville, SC (US); John David Ward, Woodruff, SC (US); James Ryan Connor, Greenville, SC (US); Mark Lawrence Hunt, Simpsonville, SC (US); Blake Allen Fulton, Greenville, SC (US)

(73) Assignee: General Electric Company, Schenectady, NY (US)

( * ) Notice: Subject to any disclaimer, the term of this patent is extended or adjusted under 35 U.S.C. 154(b) by 639 days.

(21) Appl. No.: 14/023,568

(22) Filed: Sep. 11, 2013

(65) Prior Publication Data
US 2015/0071788 A1 Mar. 12, 2015

(51) Int. Cl.
*F01D 5/00* (2006.01)
*F01D 5/14* (2006.01)
*B23P 6/00* (2006.01)

(52) U.S. Cl.
CPC .............. *F01D 5/14* (2013.01); *B23P 6/005* (2013.01); *F01D 5/005* (2013.01); *Y10T 29/49734* (2015.01)

(58) Field of Classification Search
None
See application file for complete search history.

(56) References Cited

U.S. PATENT DOCUMENTS

| | | | | |
|---|---|---|---|---|
| 5,114,548 A | * | 5/1992 | Rhoades | B23P 6/002 205/662 |
| 5,662,160 A | * | 9/1997 | Correia | B22C 9/04 164/35 |

(Continued)

FOREIGN PATENT DOCUMENTS

| | | |
|---|---|---|
| EP | 1153699 A2 | 11/2001 |
| EP | 2107370 A2 | 10/2009 |

(Continued)

OTHER PUBLICATIONS

European Search Report and Opinion issued in connection with corresponding EP Application No. 14183175.0 on Jan. 23, 2015.

*Primary Examiner* — Gregory Anderson
*Assistant Examiner* — Michael Sehn
(74) *Attorney, Agent, or Firm* — McNees Wallace & Nurick LLC

(57) ABSTRACT

A modification process and modified article are disclosed. The modification process includes locating an area in an article, removing the area by machining to form a machined region, inserting a modification material into the machined region, securing the modification material to the article, machining the modification material flush with a geometry of the article, and applying a coating over at least a portion of the article. Another modification process includes locating an area under a suction side leading edge tip shroud fillet of an airfoil, removing the area by machining to form a hole, inserting a modification material having improved material properties as compared to an original base material into the hole, securing the modification material in place, machining the modification material and the airfoil to form a new fillet contour, and applying a coating over at least a portion of the airfoil. Also disclosed is the modified article.

15 Claims, 2 Drawing Sheets

(56) References Cited

U.S. PATENT DOCUMENTS

| | | | |
|---|---|---|---|
| 6,183,192 B1* | 2/2001 | Tressler | F01D 5/189 |
| | | | 415/115 |
| 6,199,746 B1* | 3/2001 | Dupree | B23P 6/005 |
| | | | 228/119 |
| 6,238,187 B1 | 5/2001 | Dulaney et al. | |
| 6,339,878 B1 | 1/2002 | Owen et al. | |
| 6,921,246 B2* | 7/2005 | Brainch | F01D 5/145 |
| | | | 415/191 |
| 7,810,237 B2 | 10/2010 | Lange et al. | |
| 7,825,348 B2 | 11/2010 | Bouet et al. | |
| 7,882,639 B2 | 2/2011 | Powers | |
| 7,934,315 B2* | 5/2011 | Milleville | B23P 6/002 |
| | | | 148/527 |
| 7,980,813 B2 | 7/2011 | Medynski et al. | |
| 8,092,168 B2 | 1/2012 | Vedhagiri et al. | |
| 8,156,649 B2 | 4/2012 | Hovel et al. | |
| 2007/0157447 A1* | 7/2007 | Prevey | B23P 6/002 |
| | | | 29/402.01 |
| 2009/0064500 A1 | 3/2009 | Reynolds et al. | |
| 2009/0252987 A1* | 10/2009 | Greene, Jr. | G01N 29/228 |
| | | | 428/678 |
| 2010/0129228 A1* | 5/2010 | Strohl | F01D 5/141 |
| | | | 416/239 |
| 2010/0135779 A1 | 6/2010 | Stimper | |
| 2011/0099809 A1 | 5/2011 | Hovel et al. | |
| 2011/0099810 A1 | 5/2011 | Stankowski et al. | |
| 2012/0222306 A1 | 9/2012 | Mittendorf et al. | |

FOREIGN PATENT DOCUMENTS

| | | |
|---|---|---|
| WO | 9202329 A1 | 2/1992 |
| WO | 2009012747 A2 | 1/2009 |
| WO | 2009143819 A1 | 12/2009 |

\* cited by examiner

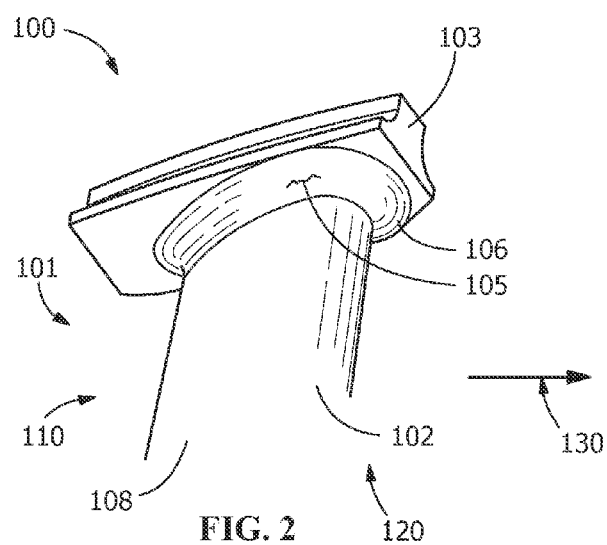
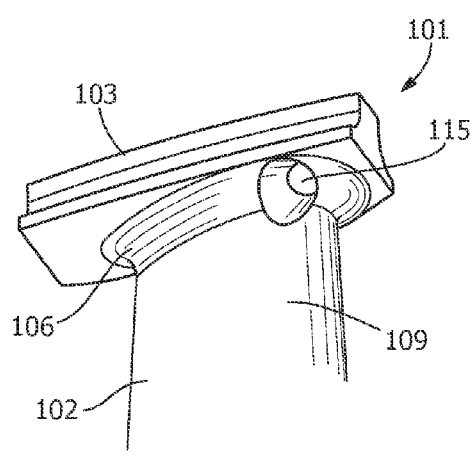
FIG. 2   FIG. 3
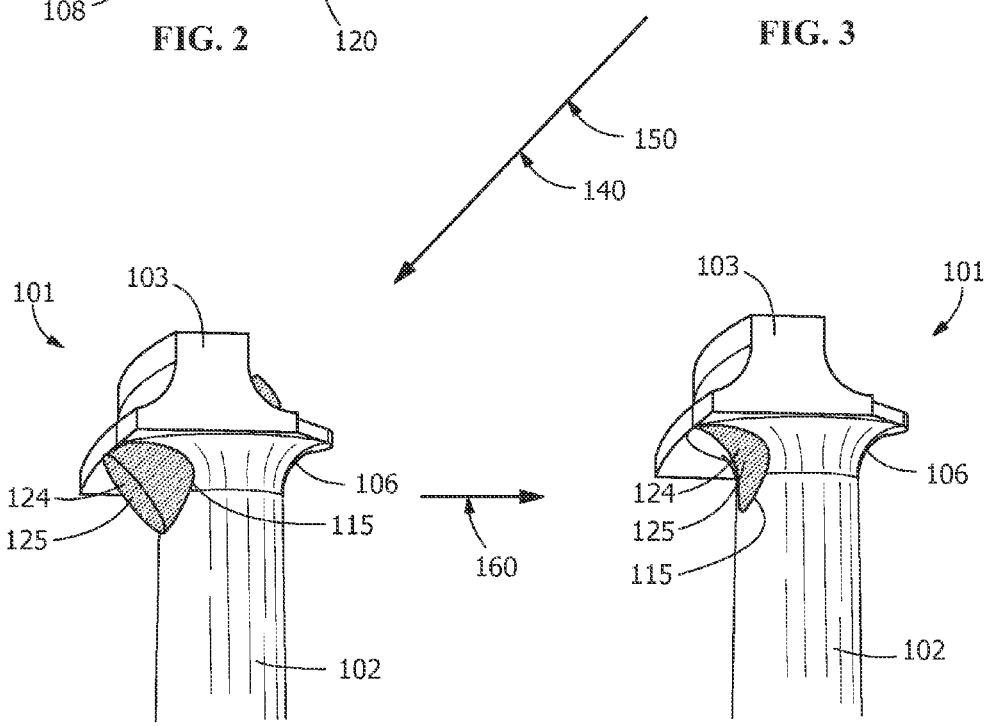
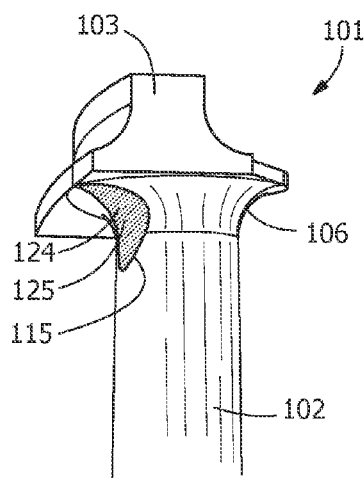
FIG. 4   FIG. 5

MODIFICATION PROCESS AND MODIFIED ARTICLE

FIELD OF THE INVENTION

The present invention is directed to modification processes and modified articles. More specifically, the present invention is directed to modification processes for an increased stress area in a turbine component and modified turbine components.

BACKGROUND OF THE INVENTION

Turbine components such as airfoils experience extreme stresses during operation. Some of those stresses include increased pressure and temperature which may be concentrated on specific areas of the turbine component. One specific area is under the suction side leading edge tip shroud fillet of an airfoil, where increased stress may lead to a creep rupture or cracking Stresses of this type can lead to early removal, discard and replacement of the expensive airfoil. This reduces the expected operational lifetime of the airfoil, increasing maintenance costs and operational costs of a system.

One modification method includes weld build ups over an increased stress area, followed by machining The weld build ups reduce material properties and increase the risk of stressing additional areas at the weld interface with the blade and in the weld metal. Additionally, current modification processes do not sufficiently increase material properties of the increased stress areas of the airfoil to provide a usable modified article.

A modification process to remove increased stress areas and increase material properties, as well as a modified article that do not suffer from one or more of the above drawbacks would be desirable in the art.

BRIEF DESCRIPTION OF THE INVENTION

In an exemplary embodiment, a modification process includes locating an area in an article, removing the area by machining to form a machined region, inserting a modification material into the machined region, securing the modification material to the article, machining the modification material flush with a geometry of the article, and applying a coating over at least a portion of the article.

In another exemplary embodiment, a modification process includes locating an area under a suction side leading edge tip shroud fillet of an airfoil, removing the area by machining to form a hole in the airfoil, inserting a modification material into the hole, the modification material having improved material properties as compared to an original base material, securing the modification material in place, machining the modification material and the airfoil to form a new contour of the fillet, and applying a coating over at least a portion of the airfoil.

In another exemplary embodiment, a modified article includes a turbine component, and a modification material secured within the turbine component at a location previous occupied by an original base material subject to increased stress. The modification material has improved material properties as compared to the original base material, the improved material properties increasing stress tolerance of the turbine component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a perspective side view of an increased stress area of a turbine blade according to an embodiment of the disclosure.

FIG. 3 is a perspective side view of a machined region of a turbine blade according to an embodiment of the disclosure.

FIG. 4 is a perspective view of a modification material in a machined region of a turbine blade according to an embodiment of the disclosure.

FIG. 5 is a perspective view of a modified turbine blade according to an embodiment of the disclosure.

Wherever possible, the same reference numbers will be used throughout the drawings to represent the same parts.

DETAILED DESCRIPTION OF THE INVENTION

Figure 1:
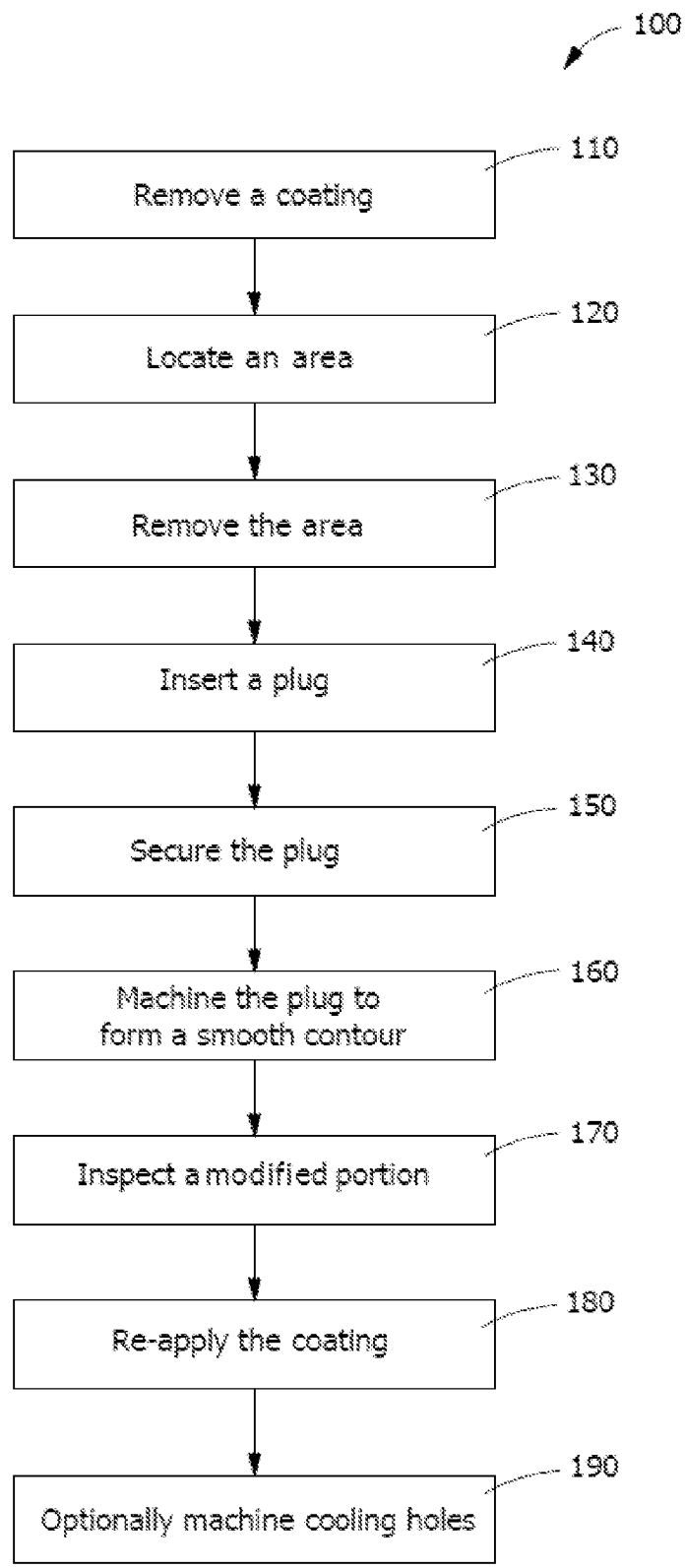
FIG. 1 is a flow chart of a modification process according to an embodiment of the disclosure.

Provided are an exemplary modification process and modified article. Embodiments of the present disclosure, in comparison to processes and articles not using one or more of the features disclosed herein, increase operational life of a turbine component, increase efficiency of turbine component repair, reduce scrappage of turbine components, decrease stress during modification, improve material properties of a modified article, increase stress resistance of turbine components, reduce or eliminate creep rupture stress, or a combination thereof Referring to FIG. 1-FIG. 5, in one embodiment, a modification process 100 removes an area 105 of an article 101, and replaces the area 105 with a modification material 124 to increase an operational life of the article 101. The article 101 is any suitable article such as, but not limited to, a turbine component. The modification process 100 includes removing a coating 108 (step 110) from the article 101, locating (step 120) the area 105 in the article 101, removing the area 105 (step 130) by machining while forming a machined region 115, inserting (step 140) a modification material 124 into the machined region 115, securing (step 150) the modification material 124 within the article 101, machining (step 160) the modification material 124 to be flush with an existing geometry of the article 101, inspecting (step 170) a modified portion, and re-applying (step 180) the coating 108 over the modified portion. In another embodiment, the modification process 100 includes drilling (step 190) internal cooling holes.

The article 101 may be any suitable article such as, but not limited to a turbine component, an airfoil, (such as a turbine airfoil identified as a General Electric Company 7FA or a S2B), a bucket 102, a shroud 103, a nozzle, a hot gas path component, or a combination thereof The area 105 may be any portion of the article 101 that is subject to various increased stresses including, but not limited to, stress-rupture, increased temperature, alternating stresses, fatigue, and/or pressure. In one embodiment, the area 105 includes a section of distressed material such as, a pit, a crack, erosion, or a combination thereof. In another embodiment, the distressed material may be formed from any one of a number of sources, the modification process 100 being directed to the removal of the distressed material (step 130) after location (step 120) of the area 105 through any suitable means of inspection. Suitable means of inspection include, but are not limited to visual inspection, magnetic particle inspection (for ferrous alloys), eddy current, acoustic emission, pulsed laser, infrared, ultrasonic, radiographic, fluorescent penetrant inspection (FPI), or a combination thereof.

In one embodiment, the coating 108 is removed (step 110) from the base material 109 of the article 101 prior to locating (step 120) the area 105. However, depending upon the inspection technique utilized, the area 105 may be located prior to removal of the coating 108, so that the sequence of these steps may be interchangeable. The coating 108 is removed (step 110) by any suitable method capable of exposing the base material 109. Suitable methods of removing (step 110) the coating 108 include, but are not limited to, water jet processes, chemical stripping, mechanical stripping, or a combination thereof. In one embodiment, the area 105 is located (step 120) without removing the coating 108 (step 110), after which removing the area 105 (step 130) by machining also removes the coating 108, eliminating the need for a separate step.

Removing the area 105 (step 130) by machining forms the machined region 115 having any suitable geometry, the size of the machined region 115 being dependent on the size of the area 105. A suitable geometry of the machined region 115 includes, but is not limited to, extending partially through the article 101, extending fully through the article 101, a hole, a cylinder, a cone, an oval, a portion of a sphere, a channel, a recess, or a combination thereof. In one embodiment, removing the area 105 (step 130) includes conventional machining or non-conventional machining, such as, but not limited to, thermal energy machining, chemical energy machining, laser machining, electrical energy machining (i.e. electrical discharge machining (EDM)), or a combination thereof. When removing the area 105 (step 130), the machining method preferably also removes any distressed material surrounding the area 105. In one embodiment, a plurality of the areas 105 are removed (step 130) by machining, forming a plurality of the machined regions 115.

Upon removing the area 105 (step 130) by machining, the modification material 124 is inserted (step 140) into the machined region 115 by any suitable method such as, but not limited to, laser deposition, layer by layer deposition, physical placement of the modification material 124 within the machined region 115, or a combination thereof. The modification material 124 may have any suitable composition including, but not limited to, the same composition as a base material 109 of the article 101, a composition substantially similar to the base material 109, a composition having superior material properties as compared to the base material 109, or a combination thereof. Superior material properties, as used herein, refers to an increased material strength, an increased ability to withstand stress, an increased ability to withstand strain, a decreased occurrence of distressed material formation, or a combination thereof. It is necessary to identify the material comprising the base material 109 in order to select the proper replacement material for the modification material 124.

For example, in one embodiment, the modification material 124 is a single crystal grain structure composition, characterized by a nominal weight percentage of about 7.5% cobalt, about 7.5% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, between about 0.002% and about 0.03% yttrium, and a balance of nickel.

In another example, the modification material 124 is an equiaxed grain structure composition, characterized by a nominal weight percentage of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.12% Si, up to about 0.1% Mn, up to about 0.1% Cu, up to about 0.01% P, up to about 0.004% S, up to about 0.1% Nb, and a balance of nickel.

Following insertion (step 140) of the modification material 124 into the machined region 115, the modification material 124 is secured (step 150) within the article 101. The securing (step 150) of the modification material 124 includes, but is not limited to, brazing, welding, friction welding, laser welding, or a combination thereof. In one embodiment, brazing includes positioning any suitable filler material in the machined region 115 between the modification material 124 and the article 101 and heating the article 101 and the modification material 124 to a temperature above the melting temperature of the filler material, but below the melting point of the base material 109. In another embodiment, the filler material has a composition, by weight, of about 14% Cr, about 9% Co, about 4% Al, about 2.5% B, and a balance of nickel. In one embodiment, the filler material has a composition, by weight, between about 13% and about 15% Cr, between about 9% and about 11% Co, between about 3.2% and about 3.8% Al, between about 2.2% and about 2.8% Ta, between about 2.5% and about 3.0% B, up to about 0.10 Y (with or without being present), incidental impurities, and a balance Ni. In another embodiment, the brazing is performed in a vacuum and includes heating at between about 2125° F. and about 2175° F. for between about 15 minutes and about 30 minutes, then diffusing at between about 1975° F. and about 2025° F. for between about 2 hours and about 4 hours. These materials are exemplary. It will be understood that the selection of the filler material will be dependent upon the base material 109, which in turn will dictate brazing parameters for the substrate material/base material combination.

In one embodiment, the modification material 124 is a plug 125 having a geometry corresponding to the machined region 115. For example, in another embodiment, the plug 125 has a conical geometry corresponding to conical geometry of the machined region 115. The machined region 115 having the conical geometry provides superior mechanical retention of the plug 125 having the corresponding geometry. In one embodiment, the plug 125 is friction welded within the machined region 115. The friction welding includes rotating the plug 125 with respect to the article 101 to generate a heat that secures the plug 125 (step 150) within the article 101. During friction welding, the machined region 115 having a conical geometry reduces a heat input as compared to the cylindrical geometry.

After the securing (step 150) of the modification material 124, the machining of the modification material 124 (step 160) forms a surface flush with an existing geometry of the article 101 or re-contours the modification material 124 and a portion of the article 101. For the article 101, this restores aerodynamics to the modified component. The article 101 is then inspected (step 170) and the coating 108 is then re-applied (step 180) over the base material 109.

The coating 108 is re-applied (step 180) using any suitable coating method including, but not limited to, vapor deposition, slurry deposition, or any thermal spray process including high velocity oxygen fuel spraying (HVOF), high velocity air fuel spraying (HVAF), vacuum plasma spray (VPS), air plasma spray (APS), ion plasma deposition (IPD), electron-beam physical vapor deposition (EBPVD), cold spray, or a combination thereof. The coating 108 is any suitable material, such as but not limited to MCrAlX, NiAl, PtAl, PtNiAl, or a combination thereof. MCrAlX is an alloy having M selected from one or a combination of iron, nickel, cobalt, and combinations thereof; and Cr is chromium, Al is aluminum, and X is an element selected from the group of solid solution strengtheners and gamma prime formers consisting of Y, Tc, Ta, Re, Mo, and W and grain boundary strengtheners consisting of B, C, Hf, Zr, and combinations thereof.

In one embodiment, removing the areas 105 (step 130) by machining exposes the internal cooling holes extending within the article 101. In another embodiment, the inserting (step 140) and the securing (step 150) of the modification material 124 within the machined region 115 may cover and/or close off the internal cooling holes. In a further embodiment, the internal cooling holes are restored by drilling (step 190) through the modification material 124 permitting cooling air to flow through the internal cooling holes that were covered and/or closed off by the securing of the plug 125 (step 150), and restoring a cooling airflow to the modified portion of the article 101. The drilling (step 190) includes, but is not limited to, a shaped-tube electrochemical machining (STEM), an electron discharge machining (EDM), or a combination thereof. The drilling (step 190) is done either before or after the coating 108 is re-applied. In one embodiment, the article 101 does not include the internal cooling holes and the drilling (step 190) is not performed.

In one embodiment, the area 105 is an increased stress area of the article 101. The increased stress area is exposed to stresses such as, but not limited to, increased temperatures, increased pressures, damaging airborne particles, or a combination thereof. For example, in one embodiment, the area 105 is located in a fillet 106 between the bucket 102 and the shroud 103 on a suction side 108 of the airfoil. The fillet 106 attaches the shroud 103 to the bucket 102, and includes weld material or heat affected zone (HAZ) material which may experience further increased damage as compared to the airfoil since this material may have different properties. In another embodiment, when the area 105 is located in the fillet 106, the machining of the modification material 124 (step 160) includes a machining of the fillet 106, which re-contours the fillet 106 and forms a flush surface between the fillet 106 and the modification material 124. In a further embodiment, the re-contouring of the fillet 106 may increase the radius of the fillet 106. The increased radius of the fillet 106 may improve a stress resistance of the article 101. Stress resistance, as used herein, refers to an increased ability to withstand stress without forming increased stress areas.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A modification process comprising:
    locating an area under a suction side leading edge tip shroud fillet of an airfoil, the area including an antecedent fillet radius;
    removing the area by machining to form a hole in the airfoil;
    inserting a modification material into the hole, the modification material having improved material properties as compared to an original base material;
    securing the modification material in place;
    machining the modification material and the airfoil to form a new contour of the fillet, forming the new contour of the fillet including increasing a radius of the fillet relative to the antecedent fillet radius to increase stress resistance of the airfoil; and
    applying a coating over at least a portion of the airfoil.

2. The modification process of claim 1, wherein the area is an increased stress area.

3. The modification process of claim 1, wherein the modification material is a plug.

4. The modification process of claim 3, further comprising machining the plug to have a geometry matching that of the removed material.

5. The modification process of claim 1, comprising removing an antecedent coating prior to locating the area.

6. The modification process of claim 1, wherein securing the modification material in place includes at least one of welding, friction welding, laser depositing, laser welding, and layer by layer depositing the modification material to the airfoil.

7. The modification process of claim 1, comprising machining a distressed material from around the area.

8. The modification process of claim 1, comprising restoring cooling holes in the turbine component by drilling with a shaped-tube electrochemical machining (STEM) device.

9. The modification process of claim 8, wherein the shaped-tube electrochemical machining device further comprises electrical discharge machining (EDM).

10. The modification process of claim 1, further comprising removing a plurality of the areas by machining to form a plurality of the machined regions.

11. The modification process of claim 1, wherein the area further includes a distressed material.

12. A modified article comprising:
    a turbine component, the turbine component including an airfoil having a suction side leading edge tip shroud fillet;
    a modification material secured within the turbine component at a location in the suction side leading edge tip shroud fillet previously occupied by an original base material subject to increased stress; and
    a modified contour of the suction side leading edge tip shroud fillet, the modified contour including an increased radius of the suction side leading edge tip shroud fillet relative to an antecedent fillet radius of an unmodified article, the increased radius providing increased stress resistance of the modified article relative to the unmodified article;
    wherein the modification material has improved material properties as compared to the original base material, the improved material properties increasing stress tolerance of the turbine component.

13. The modified article of claim 12, wherein the modification material is a plug.

14. The modified article of claim 12, wherein further comprising a joining seam between the modification material and the turbine component, the joining seam including at least one of a welded structure, a friction welded structure, a laser deposited structure, a laser welded structure, and a layer by layer deposited structure.

15. The modified article of claim 12, wherein the original base material included a distressed material.

* * * * *